United States Patent
Hirabayashi et al.

[11] Patent Number: 5,088,346
[45] Date of Patent: Feb. 18, 1992

[54] POWER PLANT STRUCTURE FOR MOTOR VEHICLE

[75] Inventors: Yuji Hirabayashi, Zushi; Kazuhiko Kanetoshi, Yokohama, both of Japan

[73] Assignee: Nissan Motor Co., Ltd., Yokohama, Japan

[21] Appl. No.: 552,707

[22] Filed: Jul. 16, 1990

[30] Foreign Application Priority Data

Jul. 21, 1989 [JP] Japan .................. 1-190050

[51] Int. Cl.⁵ ............................... F16H 57/02
[52] U.S. Cl. .................... 74/606 R; 475/206
[58] Field of Search ............ 74/606 R, 701; 475/210, 475/219, 47, 201, 206, 71

[56] References Cited

U.S. PATENT DOCUMENTS

| | | | |
|---|---|---|---|
| 4,244,242 | 1/1981 | Uno et al. | 74/710 |
| 4,289,045 | 9/1981 | Brisabois | 475/71 |
| 4,431,079 | 2/1984 | Suzuki | 475/206 X |
| 4,497,292 | 2/1985 | Hayashi et al. | 123/195 |
| 4,669,332 | 6/1987 | Katayama | 475/206 |
| 4,697,470 | 10/1987 | Sasaki et al. | 475/206 |
| 4,901,605 | 2/1990 | Taguchi | 74/606 R |
| 4,952,200 | 8/1990 | Ohkawa | 74/606 R |
| 4,990,126 | 2/1991 | Ideta et al. | 74/606 R |

FOREIGN PATENT DOCUMENTS

| | | | |
|---|---|---|---|
| 731179 | 2/1932 | France | 74/607 X |
| 1402693 | 5/1965 | France | 74/606 R |
| 2410767 | 6/1979 | France | 74/606 R |
| 2487426 | 1/1982 | France | 74/710 |
| 53-100535 | 9/1978 | Japan | 74/606 R |
| 58-39863 | 3/1983 | Japan | 74/606 R |
| 0166527 | 8/1985 | Japan | 74/606 R |
| 2220247 | 1/1990 | United Kingdom | 74/606 R |

*Primary Examiner*—Vinh T. Luong
*Attorney, Agent, or Firm*—Foley & Lardner

[57] ABSTRACT

A power plant structure for four wheel drive cars includes an engine part, a clutch part, a transmission part and a transfer part. The clutch part comprises a clutch which is received in a clutch housing. The clutch is coaxially connected to the engine. The transmission part comprises a transmission which is received in a transmission case. The transfer part comprises a transfer and differentials which are received in a transfer case. In order to increase the rigidity of the power plant, the following measures are taken. The transmission part and the transfer part are arranged in parallel with and beside the engine part and the clutch part. The transfer part is located below the transmission part. The clutch housing, the transmission case and the transfer case constitute a monolithic housing construction which is secured to the engine part.

14 Claims, 4 Drawing Sheets

POWER PLANT STRUCTURE FOR MOTOR VEHICLE

BACKGROUND OF THE INVENTION

1. Field of the Invention

The present invention relates in general to an automotive power plant structure which, for producing drive power and transmitting the power to driven wheels, comprises an engine part, a clutch part, a transmission part and a transfer part. More particularly, the present invention relates to a low-noise level automotive power plant structure which has high rigidity in construction to reduce the noise induced by the vibration thereof.

2. Description of the Prior Art

In conventional techniques, there are provided power plant structures of a type which is adopted in four wheel drive cars.

This type of power plant structure is essentially composed of an engine part, a clutch part, a transmission part and a transfer part.

The engine part is transversely mounted on an engine mounting frame of a vehicle body. The clutch part comprises a clutch and a clutch housing for receiving the clutch. The clutch is coaxially connected to a crankshaft of the engine part. The transmission part comprises a transmission and a transmission case for receiving the transmission. The transmission case is secured to the clutch housing and an input shaft of the transmission is coaxially connected to an output shaft of the clutch. The transfer part comprises a differential unit, a transfer and a transfer case. The transfer case receives the differential unit and the transfer. The transfer case is secured to a side face of the clutch housing. The differential unit comprises center and front differentials which transfer the drive power from the transmission to the front and rear driving axles.

However, the conventional power plant structure as mentioned hereinabove has a drawback which will be described as follows:

The power plant is generally too long because of the aligned arrangement of the transmission part relative to the clutch part and the engine part. That is, in this power plant, the transmission part, the clutch part and the engine part are arranged in tandem. This elongated structure tends to provide the power plant with an unsatisfactory rigidity. Furthermore, since the transmission case and the transfer case are not directly secured to the stoutly built engine part but to the clutch housing, the unsatisfied rigidity of the power plant becomes marked.

Low rigidity lowers a fundamental frequency of the power plant, the fundamental frequency being a frequency of vibration, at the lowest level, of the normal mode.

That is, when the engine runs, the transmission case and the transfer case tend to vibrate easily. Particularly, when the engine runs at a high speed, there arises an unpleasant noise induced by resonance due to the vibration of the power plant. Recently, the occurrence of this noise has become severe because the fundamental frequency has decreased with the advance of high speed and high power engines.

SUMMARY OF THE INVENTION

Therefore, it is an object of the present invention to provide a power plant structure, which is free of the above-mentioned drawbacks.

According to the present invention, there is provided a power plant structure for four wheel drive cars, which comprises an engine including a cylinder block, a bearing cap support housing and an oil pan, a clutch part including a clutch which is received in a clutch housing, the clutch being coaxially connected to the engine, a transmission part including a transmission which is received in a transmission case, the transmission part being arranged in parallel with the engine, a transfer part including a transfer and differentials which are received in a transfer case, the transfer part being arranged in parallel with the engine, a mounting portion integrally formed on the engine to directly mount thereon both the transmission case and the transfer case, and first connecting means for securely connecting the clutch housing to the engine, and second connecting means for securely connecting the transmission case and the transfer case to the mounting portion, wherein, the clutch housing, the transmission case and the transfer case are one-piece in construction.

BRIEF DESCRIPTION OF THE DRAWINGS

Other objects of the present invention will become apparent from the following description when taken in conjunction with the accompanying drawings, in which.

DESCRIPTION OF THE PREFERRED EMBODIMENT

Figure 1:
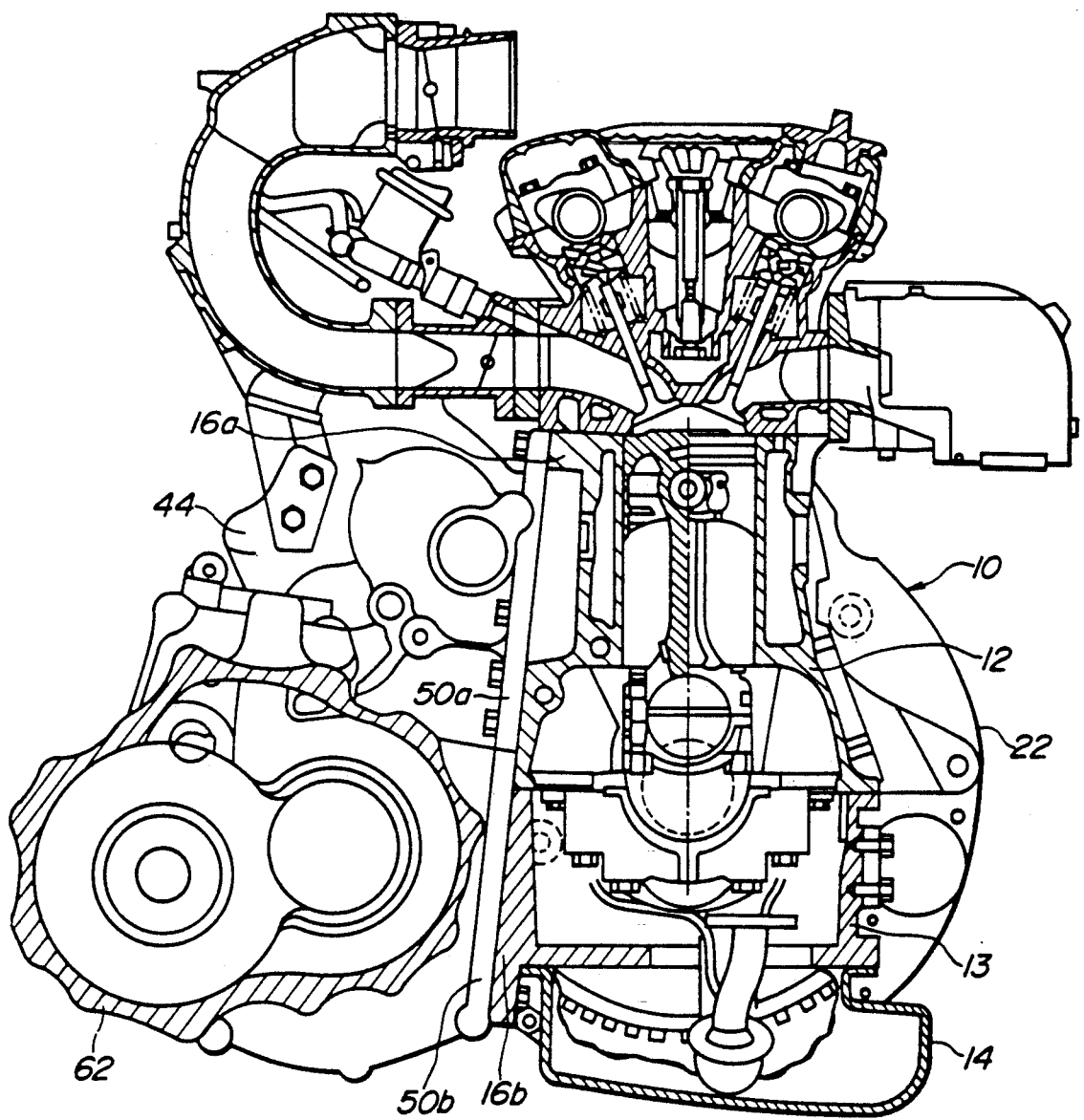
FIG. 1 is a rear vertical sectional, view of a power plant structure of the present invention as viewed along I—I of FIG. 2 and which is partially cutaway.
Figure 2:
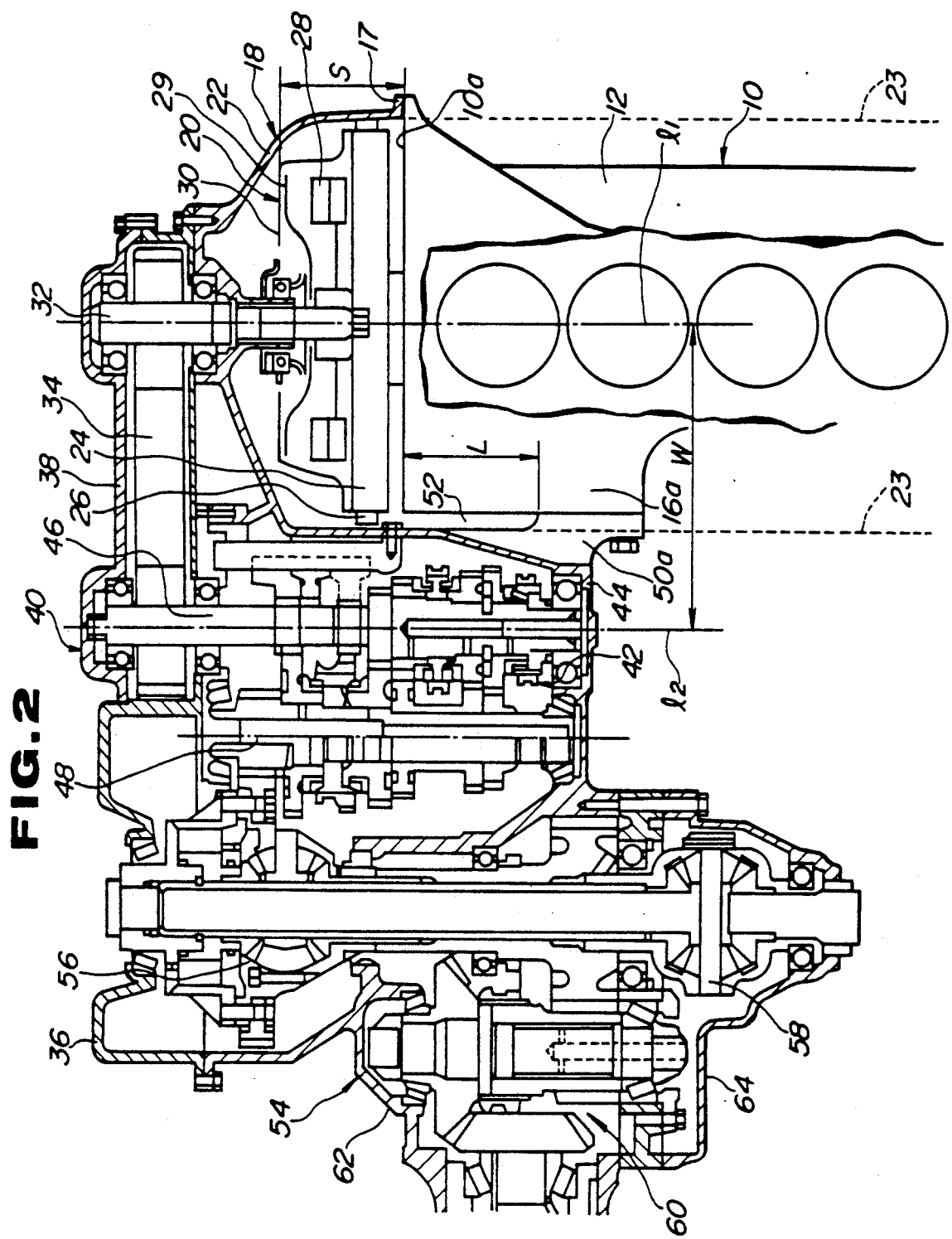
FIG. 2 is an expanded sectional view of the power plant structure of the invention as viewed along II—II of FIGS. 1 and 3.

Referring to FIGS. 1 to 4, particularly FIGS. 1 and 2, there is shown a power plant structure of the present invention for a four wheel drive car.

As is best shown in FIG. 2, the power plant structure comprises an internal combustion engine part 10, a clutch part 18, a transmission part 40 and a transfer part 54.

As will become apparent as the description proceeds, housings or cases for the clutch part 18, transmission part 40 and transfer part 54 are one-piece in construction and respectively secured to the engine part 10.

The engine part 10 is transversely mounted on an engine mounting frame (not shown) of a motor vehicle. The engine part 10 comprises a cylinder block 12, a bearing cap support housing 13 and an oil pan 14. Detailed description of the bearing cap support housing 13 can be referred to U.S. Pat. No. 4,497,292. The cylinder block 12 is formed with a plurality (four in the illustrated embodiment) of aligned cylinder bores and securely mounted on a top surface of the bearing cap support housing 13 with an interposal of a suitable sealing member or gasket therebetween.

Mounting portions 16a and 16b are monolithically formed on respective major side faces of the cylinder block 12 and the bearing cap support housing 13, the major side faces facing rearward of the vehicle. The mounting portions 16a and 16b mount thereon both the transmission case 44 and the transfer case 62. As is seen from FIG. 2, the mounting portions 16 and 16b are aligned perpendicular to a front face 10a of the engine part 10. The front face 10a is the face through and from which a crankshaft 68 of the engine part 10 projects outward.

The clutch part 18 comprises a clutch 20 and a clutch housing 22 which receives the clutch 20. The clutch housing 22 is secured at a flange portion 17 thereof to the front face 10a of the engine part 10 by means of a plurality of bolts 70. The clutch 20 comprises a flywheel 24 equipped at a periphery thereof with a ring gear 26, a clutch disc 28, a pressure plate 29 and a clutch cover 30. The clutch 20 is arranged concentric with the crankshaft 68 of the engine part 10. Designated by numeral 32 is an output shaft of the clutch 20.

The transmission part 40 is arranged beside the engine part 10 and the clutch part 18. The transmission part 40 comprises a transmission 42 and a transmission case 44 for receiving the transmission 42. The transmission part 40 is arranged in such a manner that a main shaft 46 and a counter shaft 48 of the transmission 42 are parallel to the crankshaft 68 and the clutch output shaft 32. The main shaft 46 is connected to the clutch output shaft 32 through a drive chain 34 to transfer a drive force from the output shaft 32 to the main shaft 46. A front part of the transmission case 44 is positioned beside an upper part of the clutch housing 22. The transmission case 44 is securely connected, at a first flange portion 50a monolithically formed on a rear side portion thereof, by means of a plurality of bolts 72, to a mounting portion 16a which is monolithically formed on the side face of the cylinder block 12. This arrangement of the transmission case 44 relative to the clutch housing 12 and the engine part 10 can considerably reduce the length of the power plant structure as compared with the conventional power plant structures, thereby enhancing the rigidity thereof.

The transfer part 54 comprises a transfer 60, a center differential 56, a front differential 58 and a transfer case 62. The transfer case 62 receives the transfer 60 and the differentials 56 and 58. A front part of the transfer case 62 is positioned beside a lower part of the clutch housing 22. The transfer case 62 is securely connected, at a second flange portion 50b monolithically formed on a rear side portion thereof, by means of a plurality of bolts 74, to a mounting portion 16b which is monolithically formed on a side face of the bearing cap support housing 13. The transfer case 62 is positioned below the transmission case 44.

The clutch housing 22, the transmission case 44 and the transfer case 62 form a monolithic housing structure which is securely connected to the front and side faces of the engine part 10, these two faces meeting at generally right angles. This configuration considerably enhances the rigidity of the power plant structure.

When assembly of the power plant is intended, the clutch 20 coaxially connected to the engine part 10 is inserted into the clutch housing 22 which forms the monolithic structure with the transmission case 44 and the transfer case 62. Thereafter, the engine part 10 is secured to the clutch housing 22, the transmission case 44 and the transfer case 62.

If the sizes and the weights of both the transmission case 40 and the transfer case 62 are reduced, the rigidity of the power plant structure can be enhanced. Therefore, in order to enhance the rigidity, the transmission 42 is arranged in such a manner that the main shaft 46 is positioned as close as possible to the clutch housing 22. That is, the distance "W" between an axis $l_1$ of the crankshaft 68 and an axis $l_2$ of the main shaft 46 is minimized. This arrangement however makes the flange portions 50a and 50b project into an imaginary extension 23 of the clutch housing 22. Therefore, the flange portions 50a and 50b interferes with the insertion of the clutch 20 into the clutch housing 22.

To eliminate this interference, a notch 52 is provided in the flange portions 5a and 5b.

In assembly, the clutch 20 connected to the engine part 10 is put into the notch 52 at its ring gear 26. Then, the clutch 20 is inserted, along the axis $l_1$, without any abutment of the ring gear 26 against the flange portion 50, into the clutch housing 22. The length "L" of the notch 52 is made somewhat greater than a distance "S" which is the thickness of the clutch 20.

Figure 3:
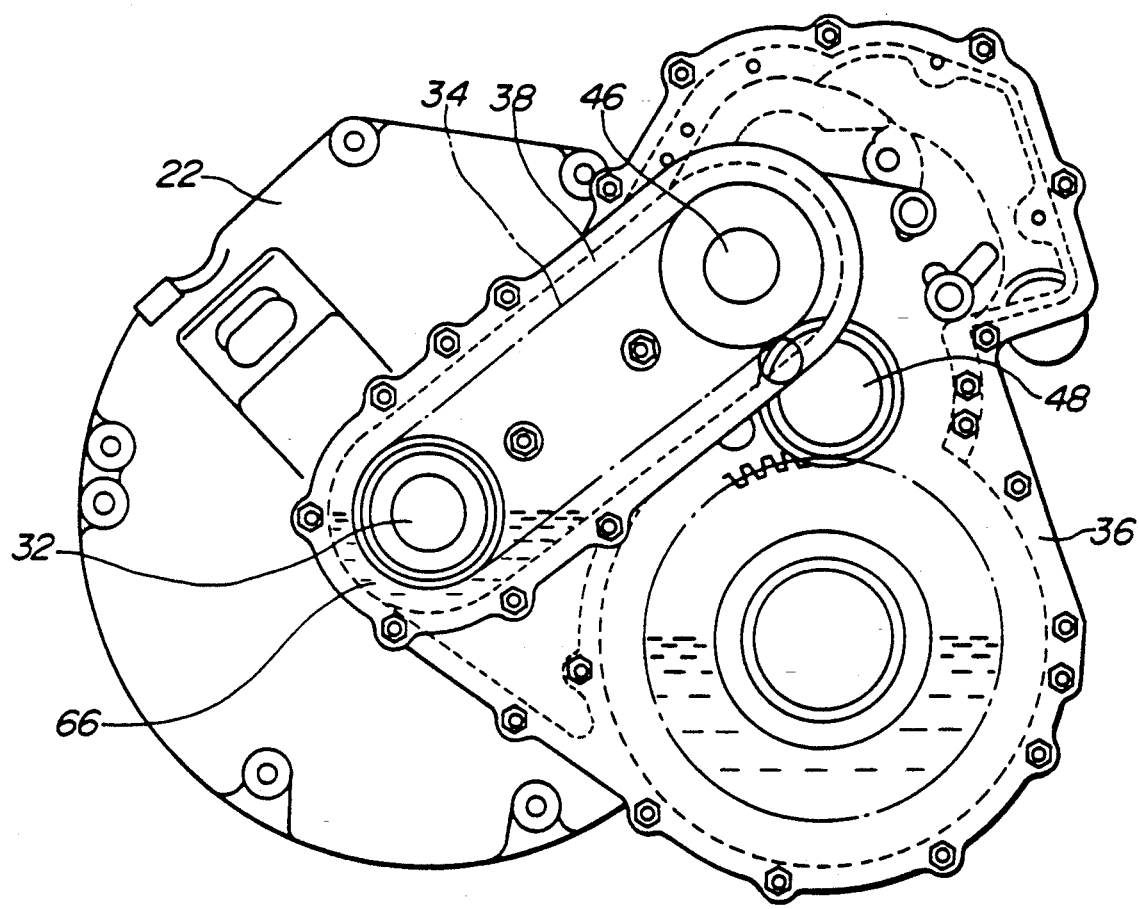
FIG. 3 is a front view of the power plant structure, showing cover parts.
Figure 4:
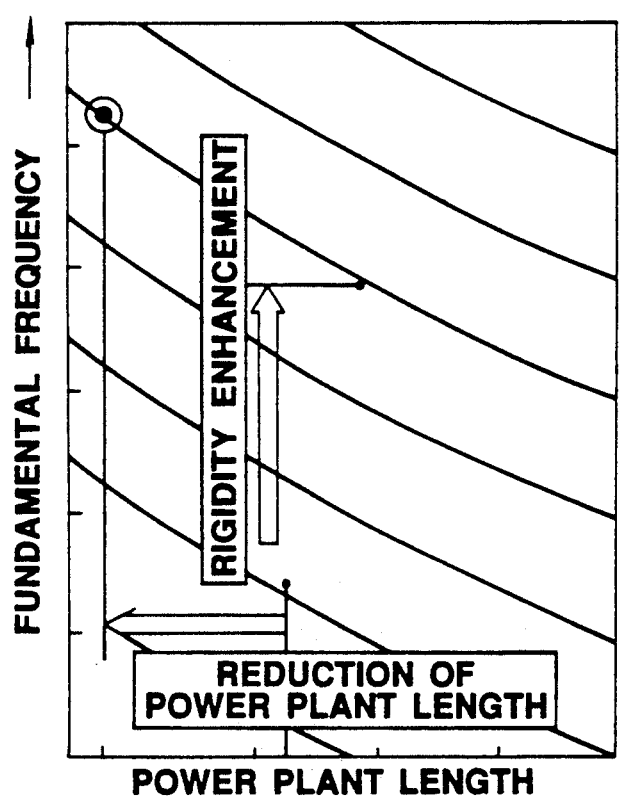
FIG. 4 is a graph showing a characteristic of the fundamental frequency of the power plant.

Referring to FIGS. 2 and 3, a front case cover 36 is provided to cover front faces of the transmission case 44 and the transfer case 62, and a portion of the clutch housing 22.

A chain cover 38 is mounted on the front case cover 36 to cover the drive chain 34 which transmits the drive force from the output shaft 32 to the main shaft 46. An oil bath 66 is provided between the front case cover 36 and the chain cover 38 to lubricate the drive chain 34. A rear case cover 64 covers a rear face of the transfer case 62.

As mentioned hereinabove, this unique construction of the power plant structure is effective in considerably enhancing the rigidity thereof. As the rigidity increases, the fundamental frequency of the power plant increases, too. Accordingly, with the present invention, the vibration of the power plant structure can be considerably reduced and particularly, when the engine runs at a high speed, noise induced by resonace can be suppressed or at least minimized.

What is claimed is:

1. A power plant structure for motor vehicle, comprising:
    an engine including a cylinder block, a bearing cap support housing and an oil pan;
    a clutch part including a clutch which is received in a clutch housing, said clutch being coaxially connected to said engine, said clutch housing being directly mounted on said engine;
    a transmission part including a transmission which is received in a transmission case, said transmission part being arranged in parallel with said engine;
    a transfer part including a transfer and differentials which are received in a transfer case, said transfer part being arranged in parallel with said engine;
    a mounting portion monolithically formed on said engine to directly mount thereon both said transmission case and said transfer case;
    first connecting means for directly securely connecting said clutch housing to said engine; and
    second connecting means for securely connecting said transmission case and said transfer case to said mounting portion;
    wherein, said clutch housing, said transmission case and said transfer case are one-piece in construction.

2. A power plant structure as claimed in claim 1, in which said clutch housing is directly secured to a front face of said engine, the front face being the face through and from which a crankshaft of said engine projects outward.

3. A power plant structure as claimed in claim 2, in which said transmission case is positioned beside an upper part of said clutch housing, and is directly securely connected, at a first flange portion monolithically formed on a rear side portion thereof, to an upper part of said mounting portion, said rear side portion of said transmission case facing said upper part of said mounting portion.

4. A power plant structure as claimed in claim 3, in which said transfer case is directly positioned beside a lower part of said clutch housing and below said transmission case, and is securely connected, at a second flange portion monolithically formed on a rear side portion thereof, to a lower part of said mounting portion, said rear side portion of said transfer case facing said lower part of said mounting portion.

5. A power plant structure as claimed in claim 4, in which said first and second connecting means comprise a plurality of connecting bolts.

6. A power plant structure as claimed in claim 5, in which said first and second flange portions have a notch, said notch preventing said clutch from abutting against said first and second flange portions when inserting said clutch into said clutch housing.

7. A power plant structure as claimed in claim 6, further comprising a front case cover to cover front faces of said transmission, said transfer case and a part of said clutch housing.

8. A power plant structure as claimed in claim 7, further comprising a rear case cover to cover a rear face of said transfer case.

9. A power plant structure as claimed in claim 8, further comprising a chain cover which covers a drive chain which transmits a drive force from an output shaft of said clutch to an input shaft of said transmission.

10. A power plant structure as claimed in claim 9, further comprising an oil bath which is provided between said chain cover and a part of said front case cover.

11. A power plant structure as claimed in claim 2, wherein said mounting portion is aligned perpendicular to said front face of said engine.

12. A power plant structure as claimed in claim 4, wherein said upper and lower parts of said mounting portion are monolithically formed on side faces of said cylinder block and said bearing cap support housing, respectively, said side faces facing rearward of said motor vehicle.

13. A power plant structure as claimed in claim 9, wherein said input shaft of said transmission is parallel to said crankshaft and said output shaft of said clutch.

14. A power plant structure as claimed in claim 6, wherein said notch has a length which is greater than the thickness of said clutch.

* * * * *